US012281591B2

(12) United States Patent
Mogle, II et al.

(10) Patent No.: US 12,281,591 B2
(45) **Date of Patent: *Apr. 22, 2025**

(54) T-FAIRING INSTALLATION TOOLING ASSEMBLY

(71) Applicant: GE Infrastructure Technology LLC, Greenville, SC (US)

(72) Inventors: Thomas Alan Mogle, II, Simpsonville, SC (US); Sandra Beverly Kolvick, Simpsonville, SC (US); Daryl Paul Capriotti, Travelers Rest, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,453

(22) Filed: May 10, 2024

(65) Prior Publication Data

US 2024/0287918 A1 Aug. 29, 2024

Related U.S. Application Data

(63) Continuation of application No. 18/455,158, filed on Aug. 24, 2023, now Pat. No. 12,044,138, which is a (Continued)

(51) Int. Cl.

| | |
|---|---|
| ***F01D 25/28*** | (2006.01) |
| ***F01D 5/30*** | (2006.01) |
| ***F01D 25/24*** | (2006.01) |

(52) U.S. Cl.
CPC ......... *F01D 25/285* (2013.01); *F01D 5/3007* (2013.01); *F01D 25/246* (2013.01); (Continued)

(58) Field of Classification Search
CPC ...... F01D 25/285; F01D 25/28; F01D 25/246; F01D 5/3007; F05D 2230/60; F05D 2230/68; F05D 2260/30; F05D 2260/50
See application file for complete search history.

(56) References Cited

U.S. PATENT DOCUMENTS

| | | | |
|---|---|---|---|
| 8,381,379 | B2 | 2/2013 | Holmes et al. |
| 11,092,039 | B2 | 8/2021 | Kolvick et al. |

(Continued)

FOREIGN PATENT DOCUMENTS

| | | | |
|---|---|---|---|
| CN | 112096462 | A | 12/2020 |
| EP | 1614856 | A1 | 1/2006 |

(Continued)

*Primary Examiner* — Christopher J. Besler
(74) *Attorney, Agent, or Firm* — Dority & Manning, P.A.

(57) ABSTRACT

A tooling assembly for installation relative to a first and second turbomachine component is provided. The tooling assembly includes an axial mounting portion removably couplable to the first turbomachine component. The axial mounting portion includes a first plate, a second plate spaced apart from the first plate, and at least one turnbuckle assembly that extends between, and is coupled to, the first plate and the second plate. At least one of the first plate and the second plate include a radial compression portion. The radial compression portion includes a compression bar radially movable relative to the axial mounting portion and configured to contact the second turbomachine component.

9 Claims, 9 Drawing Sheets

Related U.S. Application Data continuation of application No. 17/668,643, filed on Feb. 10, 2022, now Pat. No. 11,773,752.

(52) U.S. Cl.
CPC .... *F05D 2230/644* (2013.01); *F05D 2240/14* (2013.01); *F05D 2260/30* (2013.01)

(56) References Cited

U.S. PATENT DOCUMENTS

| | | | | |
|---|---|---|---|---|
| 11,506,070 | B2 | 11/2022 | Bailly et al. | |
| 12,044,138 | B2 * | 7/2024 | Mogle, II | F01D 11/006 |
| 2006/0039790 | A1 | 2/2006 | Hartmann et al. | |
| 2015/0218948 | A1 | 8/2015 | Bird | |
| 2015/0260043 | A1 | 9/2015 | Holmes et al. | |
| 2017/0191380 | A1 | 7/2017 | Kolvick et al. | |
| 2018/0202664 | A1 | 7/2018 | Merlau et al. | |
| 2019/0101012 | A1 * | 4/2019 | Kolvick | B25B 5/16 |
| 2020/0325786 | A1 | 10/2020 | Bailly et al. | |

FOREIGN PATENT DOCUMENTS

| | | | |
|---|---|---|---|
| EP | 3736081 | A1 | 11/2020 |
| FR | 2984194 | A3 | 6/2013 |

* cited by examiner

T-FAIRING INSTALLATION TOOLING ASSEMBLY

RELATED APPLICATIONS

This application is a continuation application of U.S. non-provisional patent application Ser. No. 18/455,158 having a filing date of Aug. 24, 2023, which is a continuation application of U.S. non-provisional patent application Ser. No. 17/668,643 having a filing date of Feb. 10, 2022, the disclosures of both of which are incorporated by reference herein in their entireties.

FIELD

The present disclosure relates generally to turbomachine installation tooling assemblies. In particular, the present disclosure is related to a tooling assembly for the installation of T-fairings in a turbomachine compressor.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid (e.g., air) entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Typical turbomachines include both rotating components (such as rotor blades and T-fairings) coupled to the rotor shaft and non-rotating components (such as stator vanes or nozzles) coupled to the casing. Both the rotating components and the non-rotating components are typically removable and therefore include a suitable mounting portion that is configured to engage a complementary attachment slot in the perimeter of the rotor disk (for rotating components) or the casing (for non-rotating components).

During installation, the mounting portion of the rotating components are loaded into the attachment slot one by one through an opening or window of the attachment slot. For example, the mounting portion is inserted radially into the window of the attachment slot, and subsequently, the mounting portion is moved circumferentially (with respect to an axis of the turbomachine) into engagement with the attachment slot. Each of the rotating components is installed in this manner until an entire circumferential ring of rotating components is installed in the attachments slot.

Many turbomachines are operated at partial rotational speed, which can result in an incomplete loading of the rotating components in the slots during operation. As such, the rotating components are often equipped with one or more springs or loading mechanisms that keep the rotating components radially loaded within the slot even at partial rotational speed.

However, the one or more springs or loading mechanisms create issues during installation because they impart a radial force on the rotating component that can force it out of the window. Accordingly, improved tooling for installing and rotating a circumferential ring of rotating components in a turbomachine is desired and would be appreciated in the art.

BRIEF DESCRIPTION

Aspects and advantages of the tooling assemblies in accordance with the present disclosure will be set forth in part in the following description, or may be obvious from the description, or may be learned through practice of the technology.

In accordance with one embodiment, a tooling assembly for installation relative to a first and second turbomachine component. The tooling assembly includes an axial mounting portion removably couplable to the first turbomachine component. The axial mounting portion includes a first plate, a second plate spaced apart from the first plate, and at least one turnbuckle assembly that extends between, and is coupled to, the first plate and the second plate. At least one of the first plate and the second plate include a radial compression portion. The radial compression portion includes a compression bar radially movable relative to the axial mounting portion and configured to contact the second turbomachine component.

In accordance with another embodiment, a tooling assembly for installation relative to a T-fairing ring and a compressor blade of a turbomachine is provided. The tooling assembly includes an axial mounting portion removably couplable to the compressor blade. The axial mounting portion includes a first plate, a second plate spaced apart from the first plate, and at least one turnbuckle assembly that extends between, and is coupled to, the first plate and the second plate. At least one of the first plate and the second plate include a radial compression portion. The radial compression portion includes a compression bar radially movable relative to the axial mounting portion and configured to contact the T-fairing ring of the turbomachine.

In accordance with another embodiment, a method for installing a T-fairing ring in a slot of a turbomachine using a tooling assembly is provided. The method includes mounting the tooling assembly to one or more rotor blades of the turbomachine via an axial mounting portion of the tooling assembly. The axial mounting portion includes a first plate, a second plate spaced apart from the first plate, and at least one turnbuckle assembly that extends between, and is coupled to, the first plate and the second plate. At least one of the first plate and the second plate include a radial compression portion. The method further includes compressing, via a compressor bar of the radial compression portion, one or more T-fairings in the T-fairing ring. The method may further include rotating the T-fairing ring circumferentially within the slot such that no T-fairing in the T-fairing ring is disposed entirely within a window of the slot.

These and other features, aspects and advantages of the present tooling assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present tooling assemblies, including the best mode of making and using the present systems and methods, directed to one of ordinary skill in the art, is set forth in the specification, which makes reference to the appended figures, in which.

DETAILED DESCRIPTION

Figure 1:
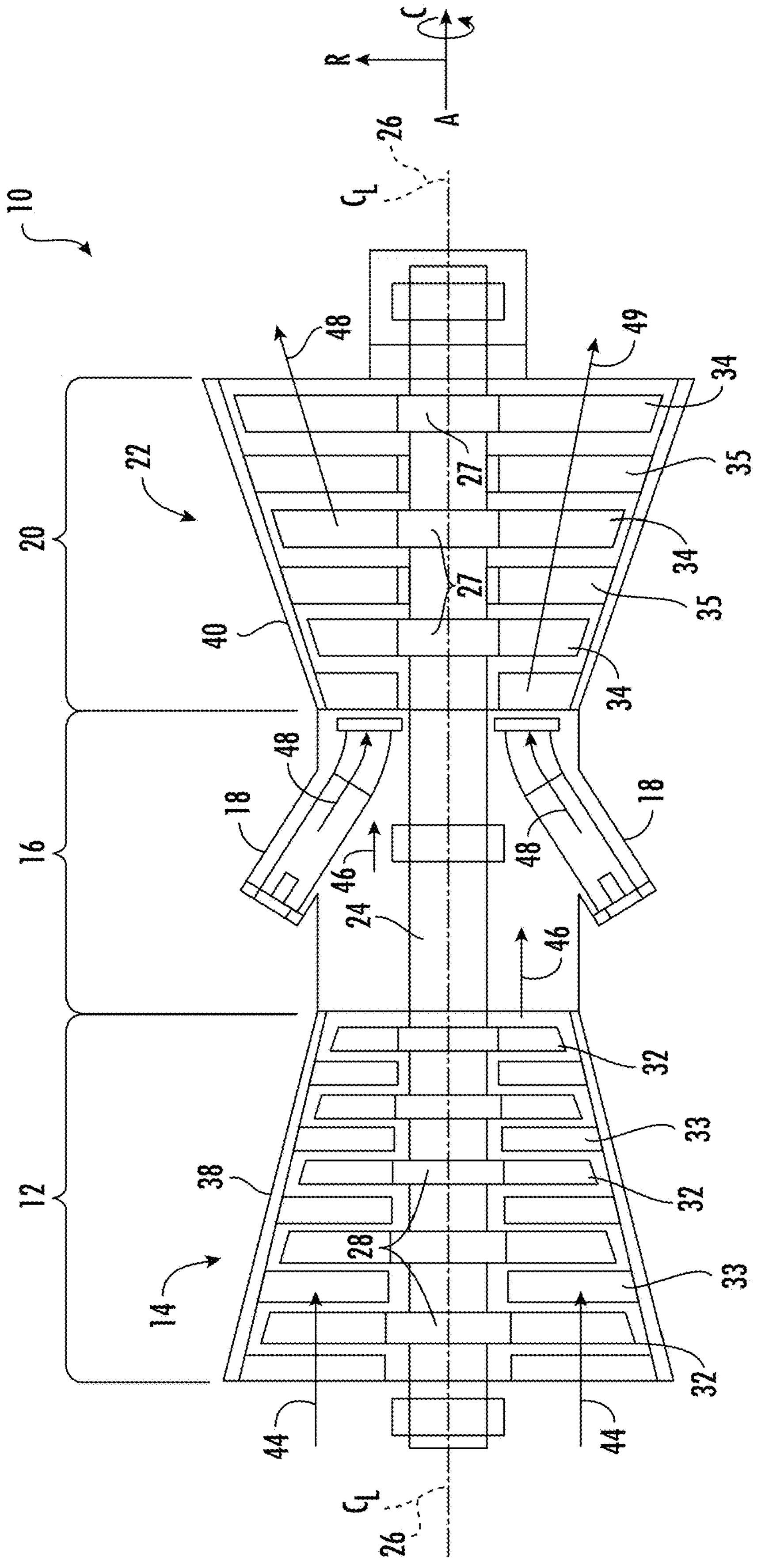
FIG. 1 is a schematic illustration of a turbomachine, in accordance with embodiments of the present disclosure.

Reference now will be made in detail to embodiments of the present tooling assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes a compressor section 12 including a compressor 14 disposed at an upstream end of the gas turbine 10, a combustion section 16 having at least one combustor 18 downstream from the compressor 14, and a turbine section 20 including a turbine 22 that is downstream from the combustion section 16. A shaft 24 extends along an axial centerline 26 of the gas turbine 10 at least partially through the compressor 14 and/or the turbine 22. In particular configurations, the shaft 24 may comprise of a plurality of individual shafts coupled to one another.

The compressor section 12 may generally include a plurality of rotor disks 28 and a plurality of rotor blades 32 extending radially outwardly from and connected to each rotor disk 28. Each rotor disk 28 in turn may be coupled to or form a portion of the shaft 24 that extends through the compressor section 12. The compressor section 12 further includes a casing 38 that circumferentially surrounds the portion of the shaft 24 and the rotor blades 32. Stator vanes 33 may be mounted to the casing 38. The rotor blades 32 and the stator vanes 33 may be arranged in an alternating manner, such that the stator vanes 33 are disposed between rotor blades 32.

The turbine section 20 may generally include a plurality of rotor disks 27 and a plurality of rotor blades 34 extending radially outwardly from and being interconnected to each rotor disk 27. Each rotor disk 27 in turn may be coupled to or form a portion of the shaft 24 that extends through the turbine section 20. The turbine section 20 further includes a turbine casing 40 that circumferentially surrounds the portion of the shaft 24 and the rotor blades 34, thereby at least partially defining a hot gas path 49 through the turbine section 20. Stationary turbine nozzles 35 may be mounted to the turbine casing 40. The rotor blades 34 and stationary turbine nozzles 35 may be arranged in an alternating manner, such that the stationary turbine nozzles 35 are disposed between rotor blades 34.

In operation, a working fluid 44 such as air is routed into the compressor 14 where it is progressively compressed in part by the rotor blades 32 as it is routed towards the combustion section 16. A compressed working fluid 46 flows from the compressor 14 and is supplied to the combustion section 16. The compressed working fluid 46 is distributed to the combustors 18 where it is mixed with a fuel (not shown) to provide a combustible mixture. The combustible mixture is burned to produce combustion gases 48 at a relatively high temperature and high velocity. The combustion gases 48 are routed through the turbine 22 where thermal and kinetic energy is transferred to the rotor blades 34, thereby causing the shaft 24 to rotate. The mechanical rotational energy may be used to power the compressor section 12 and/or to generate electricity. For example, in particular applications, the shaft 24 is coupled to a generator (not shown) to produce electricity. The combustion gases 48 exiting the turbine section 20 may then be exhausted from the gas turbine 10 via an exhaust section.

The compressor 14 and the turbine 22 may each includes rotating components (such as the rotor blades 32, the rotor blades 34, or others) and non-rotating or stationary components (such as the stator vanes 33, the stationary turbine nozzles 35, or others). The rotating components may be coupled to the rotor disks 28, 27, such that the rotating components rotate with the shaft 24. The non-rotating components may be coupled to the casing (e.g., the casing 38 or the turbine casing 40) such that the non-rotating components are stationary during operation of the gas turbine 10. Both the rotating components and the non-rotating components may include mounting portions configured to engage a complementary circumferential slot defined in the perimeter of the rotor disk 28, 27 (for rotating components) or casing 38, 40 (for non-rotating components). The mounting portions may include a dovetail, hook, or other lateral protrusions received by the corresponding circumferential slot. For example, the circumferential slot may be defined in the casing 38, 40 for non-rotating components or the rotor disks 28, 27 for rotating components.

The gas turbine 10 may define a cylindrical coordinate system having an axial direction A extending along the axial centerline 26, a radial direction R perpendicular to the axial centerline 26, and a circumferential direction C extending around the axial centerline 26. A directional legend is provided for convenience in FIGS. 1, 2, and 4.

Figure 2:
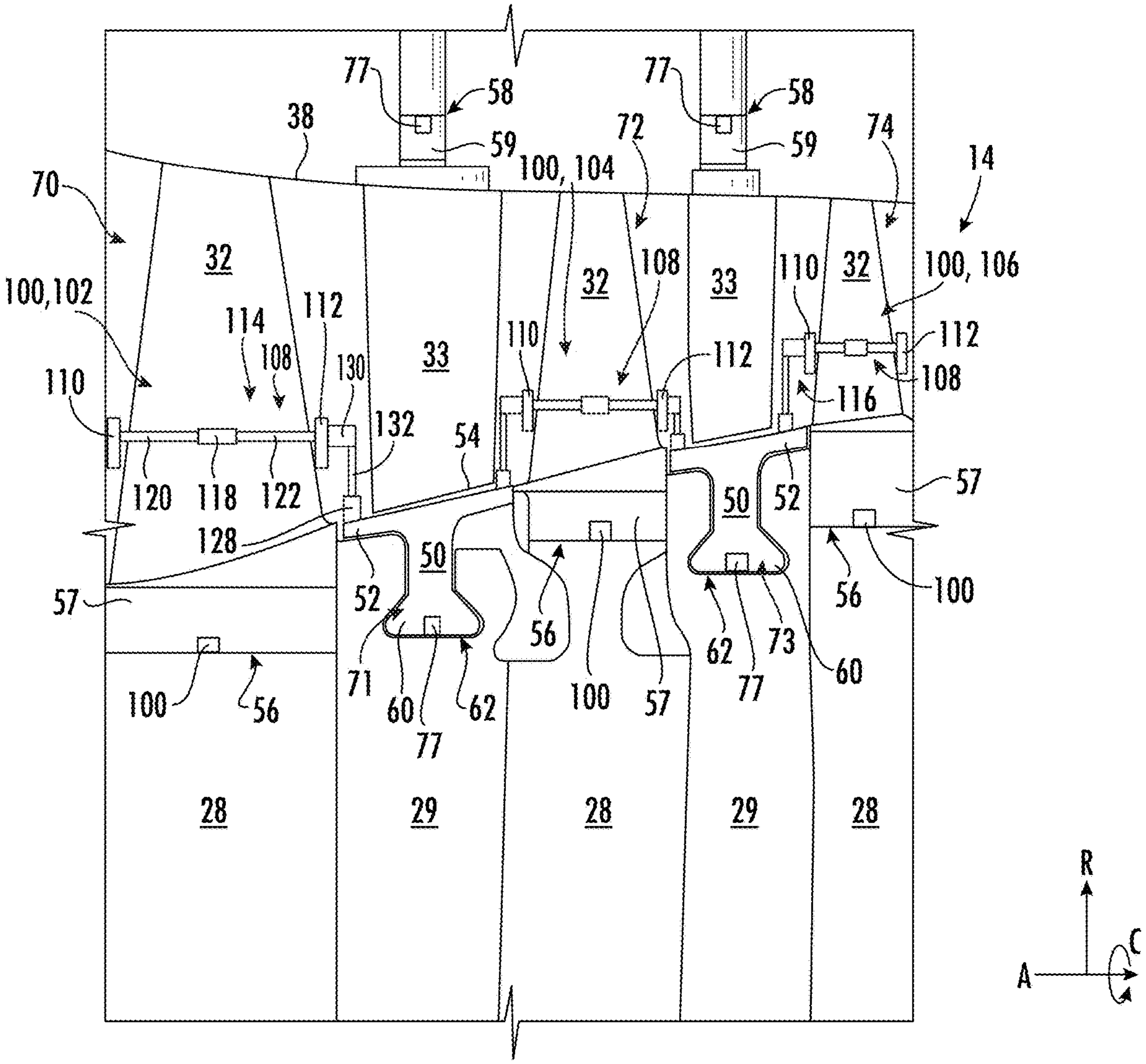
FIG. 2 illustrates an enlarged cross-sectional planar view of a portion of a compressor, in accordance with embodiments of the present disclosure.

FIG. 2 provides an enlarged cross-sectional planar view of a portion of the compressor 14 having tooling assemblies 100 for installation relative to a first and second turbomachine component, in accordance with embodiments of the present disclosure. As shown, the casing 38 generally surrounds the compressor 14 to contain a working fluid (e.g., air). Alternating stages of rotor blades 32 and stator vanes 33 arranged within the casing 38 progressively impart kinetic energy to the working fluid to produce a compressed working fluid at a highly energized state. Each rotor blade 32 may be circumferentially arranged around (and coupled to) the rotor disk 28 and may extend radially outward toward the casing 38. Conversely, each stator vane 33 may be circumferentially arranged around (and coupled to) the casing 38 and may extend radially inward toward a spacer disk 29 that separates adjacent stages of rotor blades 32.

In many embodiments, the rotor blades 32 may each include a mounting portion 57, which is formed to connect and/or to secure the rotor blade 32 to the rotor disk 28. For example, the mounting portion 57 may include a T-shaped structure, a dovetail, a hook, one or more lateral protrusions, or any combination thereof. The mounting portion 57 may be configured to mount into the rotor disk 28 in the axial direction A, the radial direction R, and/or a circumferential direction C. For example, the rotor disk 28 may define a slot or opening 56 that generally corresponds with the shape of the mounting portion 57. The slot 56 may be an axial slot or opening, a radial slot or opening, and/or a circumferential slot or opening. In exemplary embodiments, the slot 56 may be defined annularly (e.g., 360° in the circumferential direction) around the entire perimeter of the rotor disk 28.

Similarly, the stator vanes 33 may each include a mounting portion 59, which is formed to connect and/or to secure the stator vane 33 to the casing 38. For example, the mounting portion 59 may include a T-shaped structure, a dovetail, a hook, one or more lateral protrusions, or any combination thereof. The mounting portion 59 may be configured to mount into the casing 38 in the axial direction A, the radial direction R, and/or a circumferential direction C. For example, the casing 38 may define a slot or opening 58 that generally corresponds with the shape of the mounting portion 59. The slot 58 may be an axial slot or opening, a radial slot or opening, and/or a circumferential slot or opening. In exemplary embodiments, the slot 58 may be defined annularly (e.g., 360° in the circumferential direction) around the entire perimeter of the casing 38.

Figure 3:
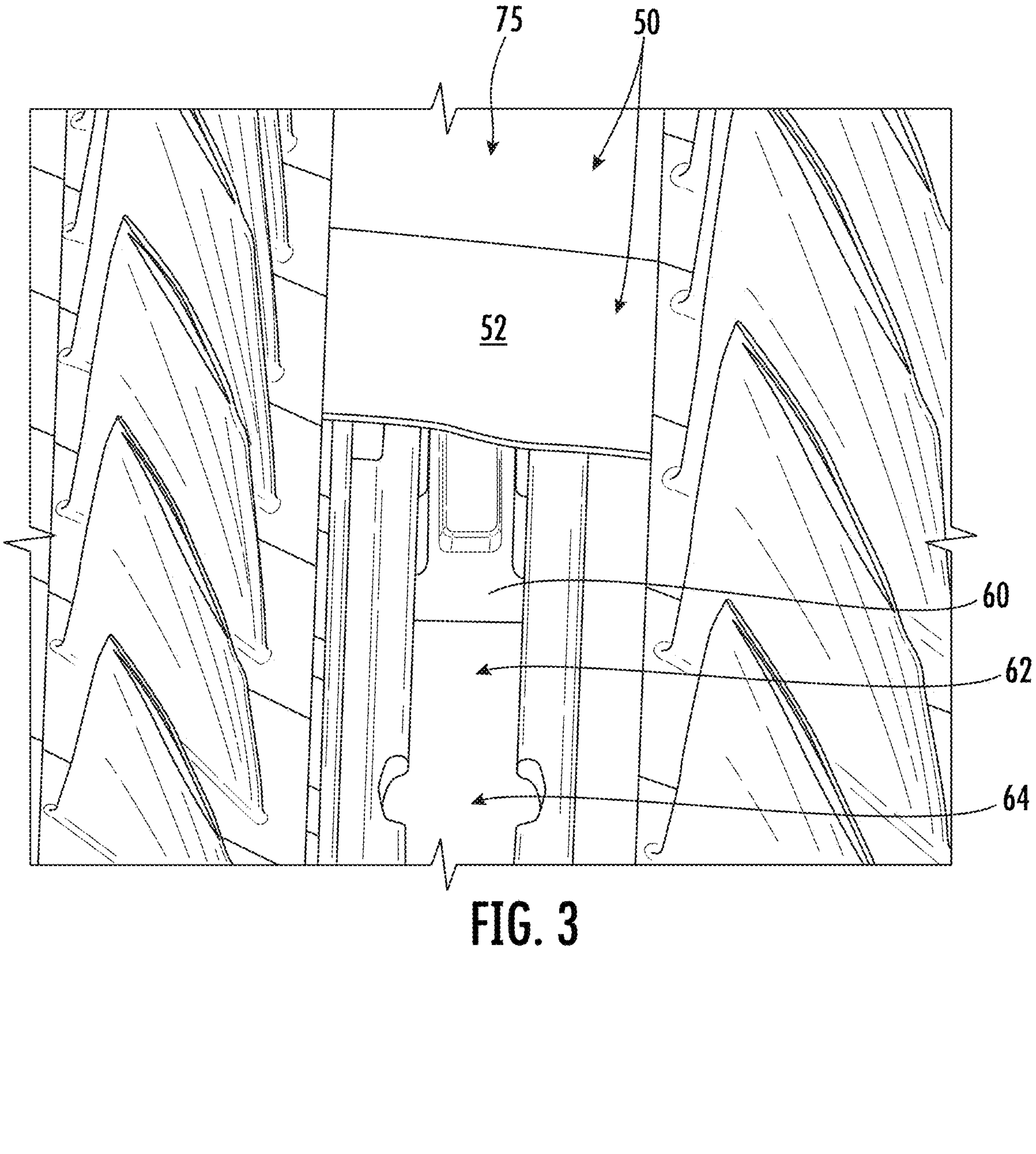
FIG. 3 illustrates an enlarged perspective view of a portion of a compressor, in which T-fairings have been omitted to show details of a window of a slot, in accordance with aspects of the present disclosure.
Figure 4:
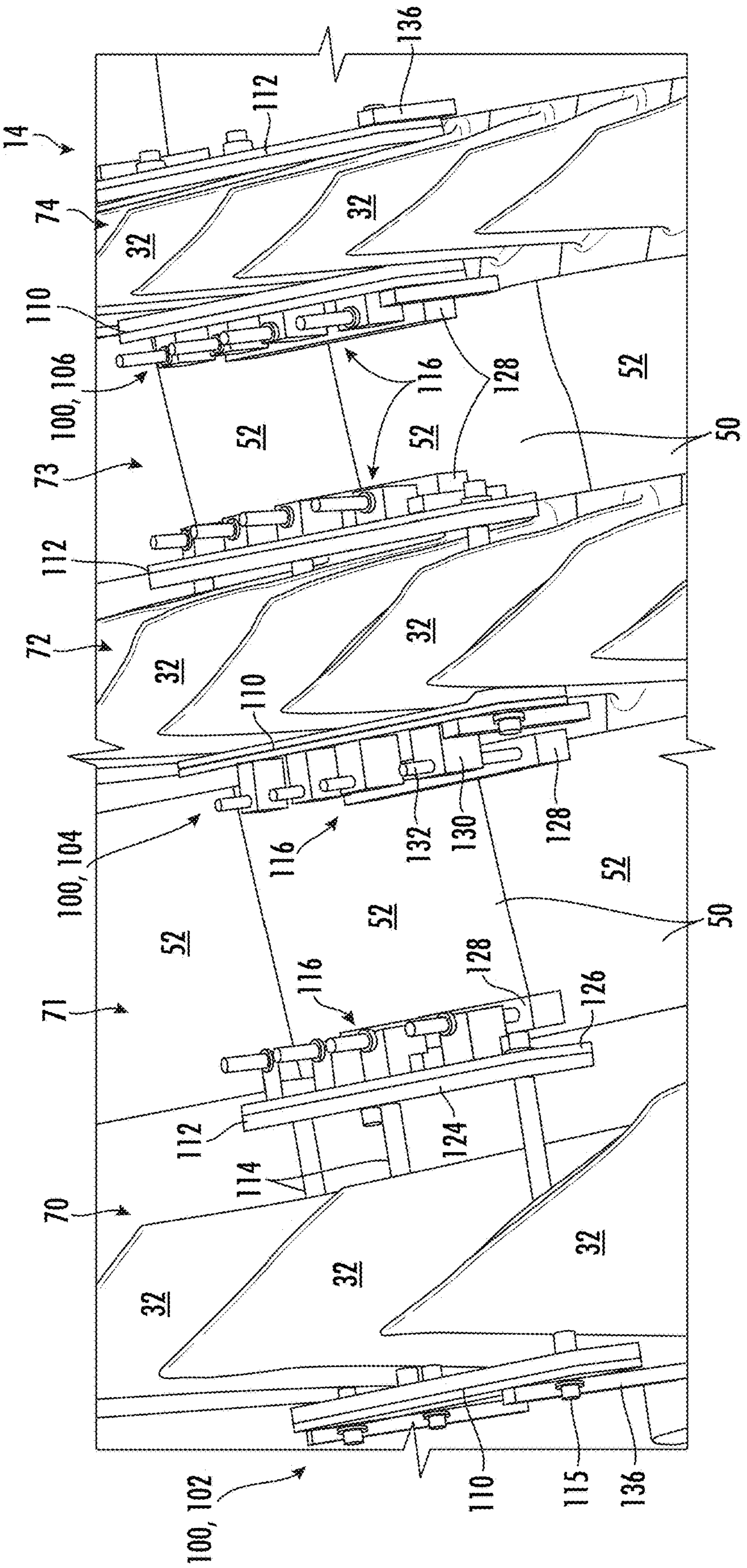
FIG. 4 illustrates a perspective view of a compressor having tooling assemblies coupled thereto, in accordance with embodiments of the present disclosure.

As shown in FIG. 2, the compressor 14 may further include T-fairings 50 circumferentially arranged around (and coupled to) the spacer disk 29. For example, the T-fairings 50 may extend radially outward from the spacer disk 29 to a platform 52. The platform 52 provides a boundary for the compressed working fluid traveling through the compressor 14. Additionally, the platform 52 generally conforms to an inner tip 54 of the stator vanes 33 to reduce leakage between the stator vanes 33 and the spacer disks 29. In many embodiments, as shown in FIGS. 3 and 4, the T-fairings 50 may be generally T-shaped segments.

In exemplary embodiments, the T-fairings 50 may each include a mounting portion 60, which is formed to connect and/or to secure the T-fairing 50 to the spacer disk 29. For example, the mounting portion 60 may include a T-shaped structure, a dovetail, a hook, one or more lateral protrusions, or any combination thereof. The mounting portion 60 may be configured to mount into the spacer disk 29 in the axial direction A, the radial direction R, and/or a circumferential direction C. For example, the spacer disk 29 may define a slot or opening 62 that generally corresponds with the shape of the mounting portion 60. The slot 62 may be an axial slot or opening, a radial slot or opening, and/or a circumferential slot or opening. In exemplary embodiments, the slot 62 may be defined annularly (e.g., 360° in the circumferential direction) around the entire perimeter of the spacer disk 29.

As shown in FIG. 2, the mounting portions 57, 59, 60 of the various compressor components may each include a mechanical spring 77 housed within a corresponding hole, void, or opening defined by the mounting portion 57, 59, 60. The mechanical spring 77 may be at least partially compressed in order to load the mounting portion 57, 59, 60 against the corresponding slot 56, 58, 62. As should be appreciated, the mechanical spring 77 may advantageously keep the compressor component loaded within the slot at any operational speed of the turbomachine (e.g., partial speed), thereby reducing wear and misalignments to the compressor component.

The compressor 14 may include a first ring 70 of rotor blades 32, a second ring 72 of rotor blades 32, and third ring 74 of rotor blades 32. Additionally, the compressor 14 may include one or more T-fairing rings disposed between the rings of rotor blades 32 (e.g., axially between). For example, the compressor 14 may include a first T-fairing ring 71 and a second T-fairing ring 73. The first T-fairing ring 71 may be disposed between (e.g., axially between) the first ring 70 and the second ring 72 of rotor blades 32, and the second t-faring ring 73 may be disposed between (e.g., axially between) the second ring 72 and the third ring 74 of rotor blades 32. The first ring 70, the second ring 72, and the third ring 74 of rotor blades 32 may each be circumferentially arranged within a respective slot 56 of a respective rotor disk 28. Similarly, the first T-fairing ring 71 and the second T-fairing ring 73 may be circumferentially arranged within a respective slot 62 of a respective spacer disk 29.

As shown in FIG. 2, one or more tooling assemblies 100 may be removably couplable to the compressor 14 to facilitate the installation of the first T-fairing ring 71 and/or the second T-fairing ring 73. The one or more tooling assemblies 100 may include a first tooling assembly 102, a second tooling assembly 104, and a third tooling assembly 106. As shown, the first tooling assembly 102 may be removably couplable to one or more rotor blades 32 in the first ring 70 of rotor blades 32 to facilitate installation of the first T-fairing ring 71. The second tooling assembly 104 may be removably coupled to one or more rotor blades 32 in the second ring 72 of rotor blades 32 to facilitate installation of either (or both) of the first T-fairing ring 71 and/or the second T-fairing ring 73. The third tooling assembly 106 may be removably coupled to one or more rotor blades 32 in the third ring 76 of rotor blades 32 to facilitate installation of the second T-fairing ring 73. The tooling assemblies 102, 104, 106 may be used together (i.e., collectively) or separately (i.e., individually) to facilitate installation of the T-fairing rings.

FIG. 3 illustrates an enlarged perspective view of a portion of the compressor 14, in which a T-fairings 50 in a T-fairing ring 75 have been omitted to show details of the slot 62, in accordance with embodiments of the present disclosure. The T-fairing ring 75 may be representative of either or both of the first T-fairing ring 71 and/or the second T-fairing ring 73. As shown in FIG. 3, the slot 62 may include an opening or window 64 sized to radially receive the mounting portion 60 of the T-fairing 50. For example, during installation of the T-fairing ring 75, the mounting portion 60 of each of the T-fairings 50 may be inserted through the window 64 into the slot 62. Subsequently, each of the T-fairings 50 are rotated circumferentially (with respect to an axial centerline of the gas turbine 10) through the slot 62 until all of the T-fairings 50 are installed and the T-fairing ring 75 is complete.

When the last T-fairing 50 in the T-fairing ring 75 is inserted through the window 64, it cannot be rotated circumferentially due to the T-fairings 50 in the T-fairing ring 75 being disposed on either side. As such, upon inserting the last T-fairing 50 in the T-fairing ring 75 into the window 64, the entire T-fairing ring 75 (i.e., all of the T-fairings 50 in the T-fairing ring 75) may be rotated circumferentially such that no singular t-faring 50 is disposed entirely within the window 64 (which could otherwise result in the T-fairings falling out of the slot 62 one by one through the window 64).

Referring back to FIG. 2 briefly, the tooling assembly 100 described herein may advantageously facilitate this operation without causing damage to the neighboring rotor blades 32. For example, the tooling assemblies 100 may removably mount to one or more rotor blades 32 and may apply a radial force to one or more T-fairings 50 in a ring of T-fairings. The radial force exerted by the tooling assembly 100 on the one or more T-fairings 50 may counteract the spring force exerted by the mechanical spring 77 while still allowing the T-fairings 50 in the T-fairing ring to slide in the circumferential direction C within the slot 62.

Figure 5:
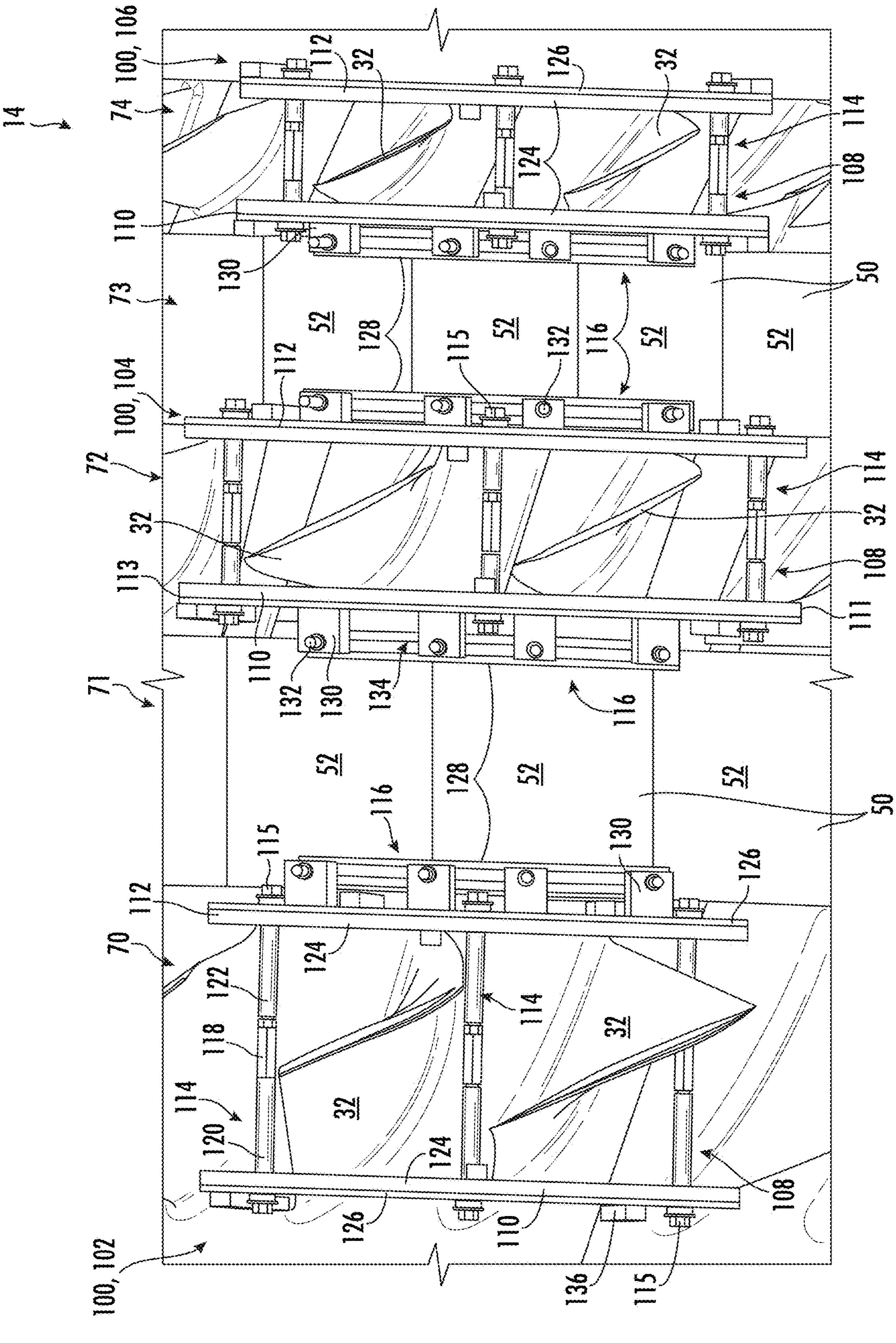
FIG. 5 illustrates a perspective view of a compressor having tooling assemblies coupled thereto, in accordance with embodiments of the present disclosure.
Figure 6:
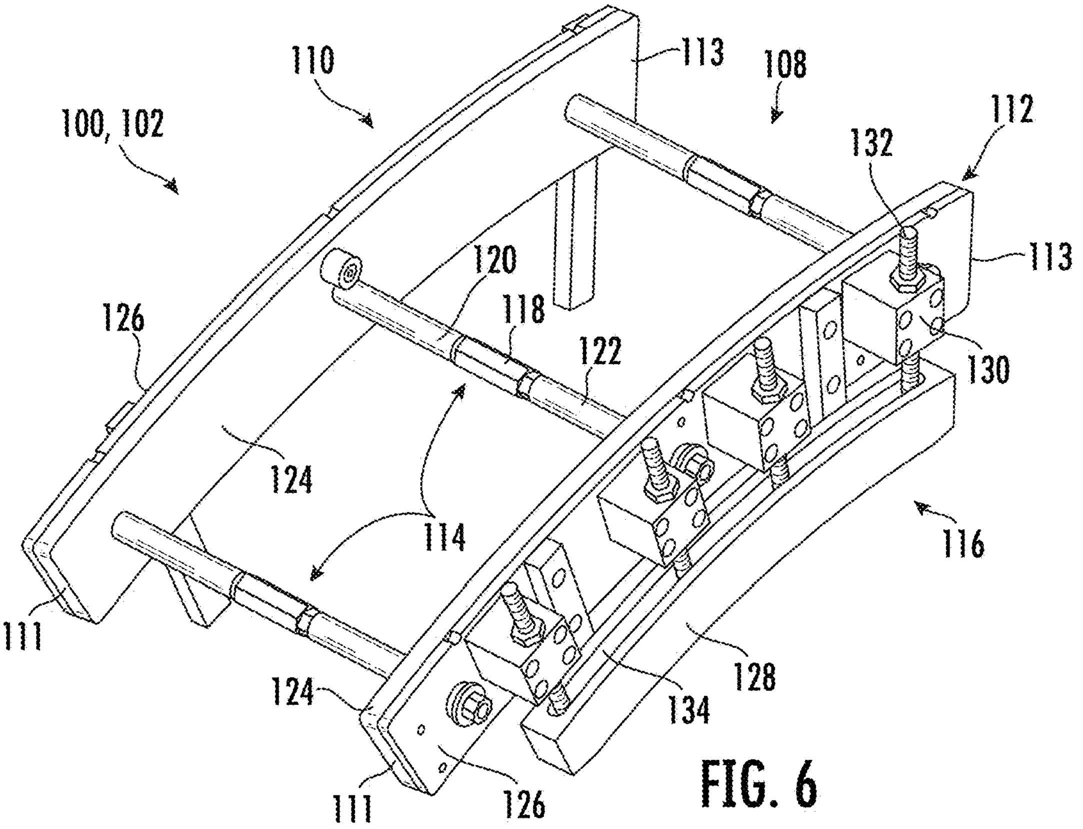
FIG. 6 illustrates a perspective view of a tooling assembly, in accordance with embodiments of the present disclosure.
Figure 7:
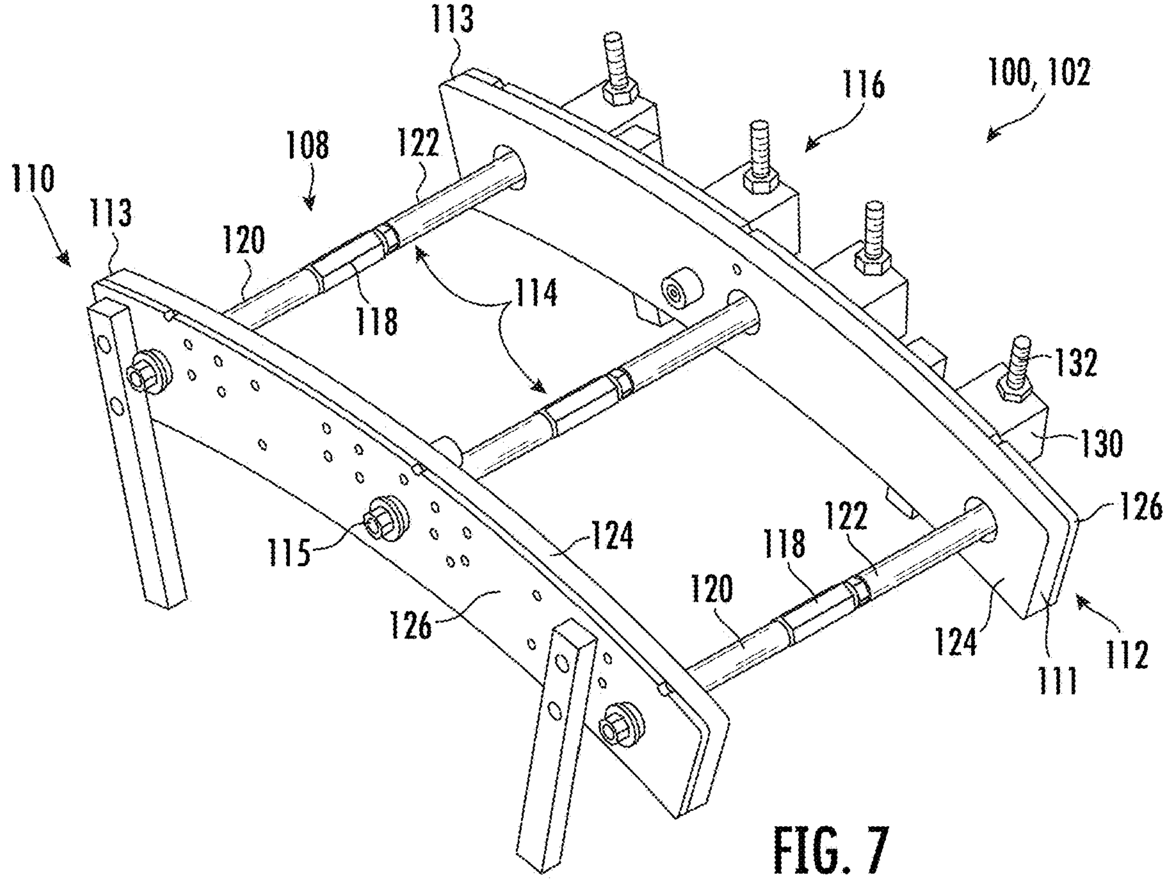
FIG. 7 illustrates a perspective view of a tooling assembly, in accordance with embodiments of the present disclosure.
Figure 8:
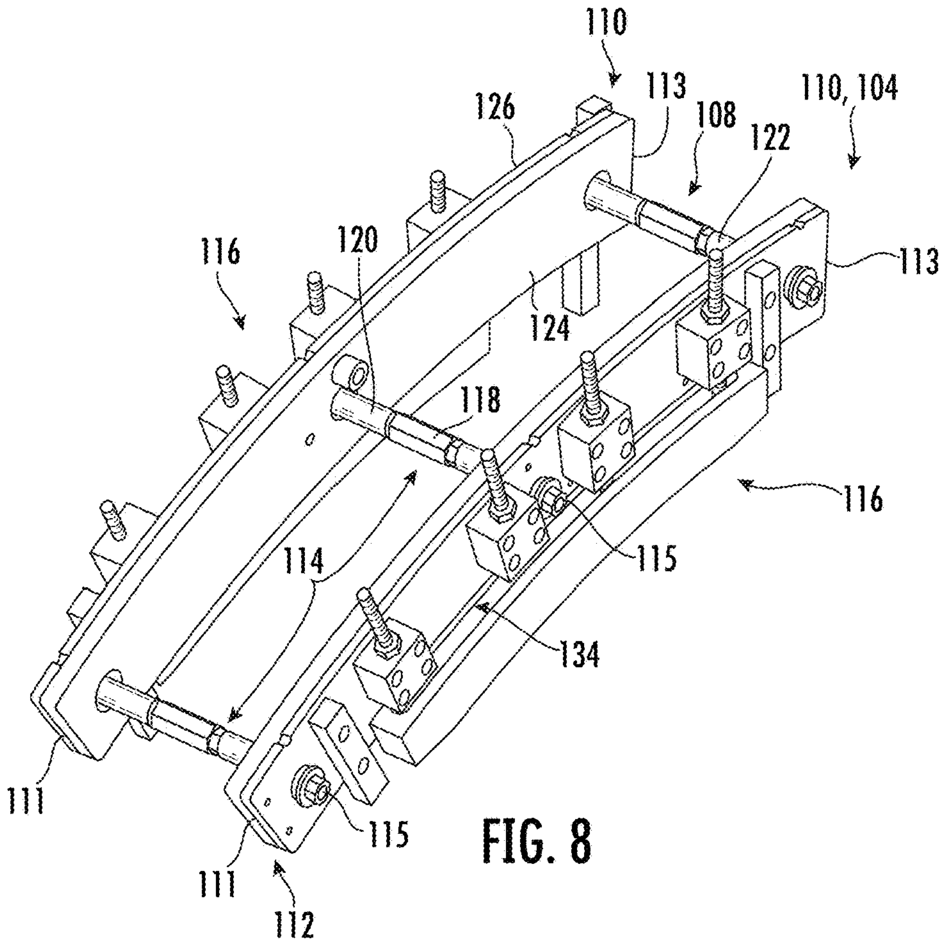
FIG. 8 illustrates a perspective view of a tooling assembly, in accordance with embodiments of the present disclosure.
Figure 9:
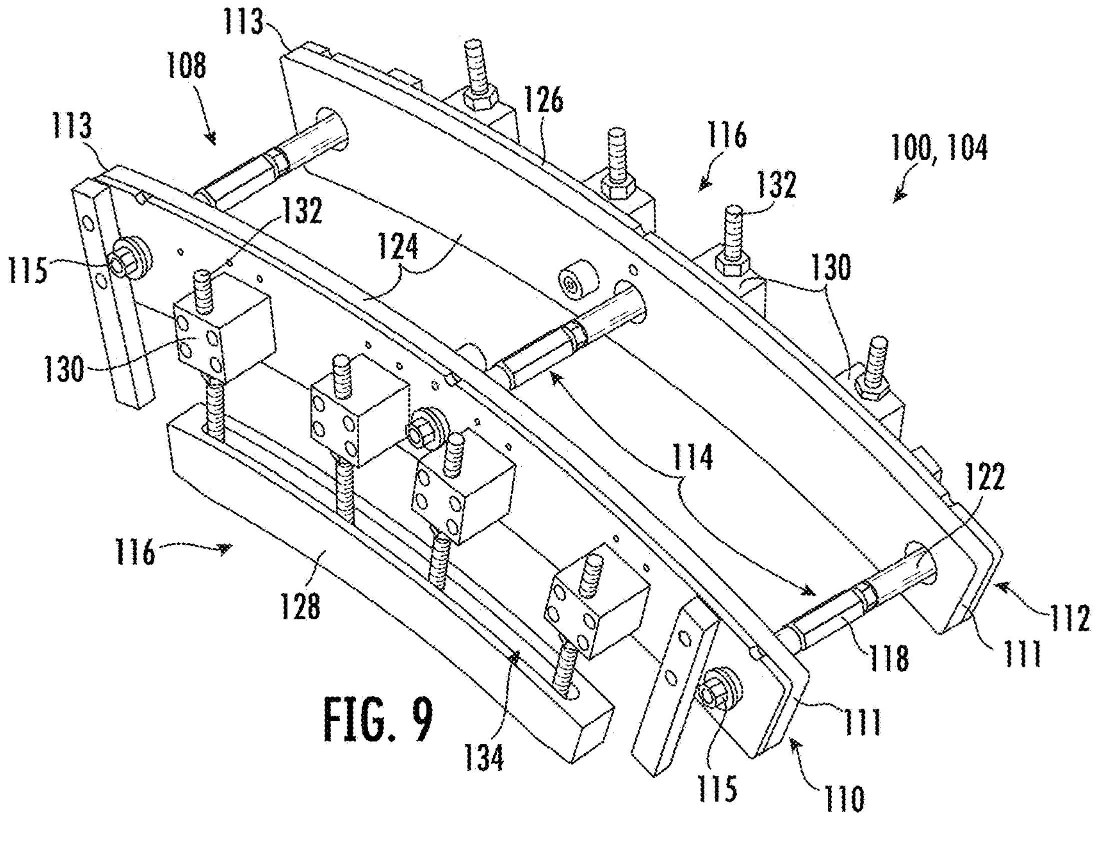
FIG. 9 illustrates a perspective view of a tooling assembly, in accordance with embodiments of the present disclosure.

FIGS. 4 and 5 each illustrate a perspective view of a compressor 14 having tooling assemblies 100 removably coupled thereto, in order to facilitate installation of the T-fairing rings, in accordance with embodiments of the present disclosure. As shown, the first tooling assembly 102 may be removably coupled to one or more rotor blades 32 in the first ring 70 of rotor blades 32 to facilitate installation of the first T-fairing ring 71. The second tooling assembly 104 may be removably coupled to one or more rotor blades 32 in the second ring 72 of rotor blades 32 to facilitate installation of either (or both) of the first T-fairing ring 71 and/or the second T-fairing ring 73. The third tooling assembly 106 may be removably coupled to one or more rotor blades 32 in the third ring 76 of rotor blades 32 to facilitate installation of the second T-fairing ring 73. The tooling assemblies 102, 104, 106 may be used together (i.e., collectively) or separately (i.e., individually) to facilitate installation of the T-fairing rings.

Each of the tooling assemblies 100 may include an axial mounting portion 108 configured to removably couple to one or more rotor blades 32 in the first, second, or third ring 70, 72, or 76. For example, the axial mounting portion 108 may include a first plate 110 and a second plate 112 spaced apart from the first plate 110 (e.g., axially spaced apart). The axial mounting portion 108 may further include on or more turnbuckle assemblies 114 extending between, and coupled to, the first plate 110 and the second plate 112. As will be discussed in more detail below, the turnbuckle assembly 114 may be configured to adjust the axial spacing between the first plate 110 and the second plate 112, in order to couple the axial mounting portion 108 to the one or more rotor blades 32. In this way, the axial spacing of the plates 110, 112 may be adjusted such that the axial mounting portion 108 may clamp to one or more of the rotor blades 32.

As shown in FIGS. 4 and 5, when the tooling assemblies 100 are coupled to the rotor blades 32, an interior surface of the first plate 110 may contact one or more of the rotor blades 32 (e.g., two rotor blades in the example shown in FIG. 5) proximate the leading edge of the one or more rotor blades 32. Similarly, an interior surface of the second plate 112 may contact one or more of the rotor blades 32 (e.g., two rotor blades in the example shown in FIG. 5) proximate the trailing edge of the one or more rotor blades 32.

Each turnbuckle assembly 114 of the one or more turnbuckle assemblies 114 may extend generally axially from the first plate 110 to the second plate 112. Each turnbuckle assembly 114 may be disposed circumferentially between two neighboring rotor blades 32, such that the turnbuckle assembly does not extent through the rotor blades 32, but rather extends axially between the plates 110, 112 in the circumferential space between two neighboring rotor blades 32.

In various embodiments, one or both of the first plate 110 and/or the second plate 112 of tooling assembly 100 may include a radial compression portion 116. For example, the radial compression portion 116 may be disposed on the plate 110, 112 that is proximate a T-fairing ring, in order to contact the T-fairings in the T-fairing ring and apply a radial force. Particularly, as shown in FIGS. 4 and 5, the first plate 110 of the first tooling assembly 102 may not include a radial compression portion 116, and the second plate 112 of the first tooling assembly 102 may include a radial compression portion 116. The first plate 110 and the second plate 112 of the second tooling assembly 104 may include a radial compression portion 116. The first plate 110 of the third tooling assembly 106 may include a radial compression portion 116, and the second plate 112 of the third tooling assembly 106 may not include a radial compression portion 116.

FIGS. 6 through 9 each illustrate a perspective view of a tooling assembly 100 in accordance with embodiments of the present disclosure. Particularly, FIGS. 6 and 7 each illustrate a perspective view of the first tooling assembly 102, FIGS. 8 and 9 each illustrate a perspective view of the second tooling assembly 104, in accordance with embodiments of the present disclosure.

As shown collectively in FIGS. 6 through 9, the tooling assembly 100 may include an axial mounting portion 108 and a radial compression portion 116. The axial mounting portion 108 may include a first plate 110 and a second plate 112 spaced apart from the first plate 110 (e.g., in the axial direction A). The plates 110, 112 may be generally parallel to one another and may each extend from a first end 111 to a second end 113. The plates 110, 112 may be generally shaped as trapezoids (e.g., rectangles having curved sides that correspond with the curvature of the circumferential direction C of the gas turbine 10). Additionally, the plates 110, 112 may be generally flat such that the plates 110, 112 are shortest in the axial direction A and longest in the circumferential direction C.

As shown in FIGS. 6 through 9, the first plate 110 and the second plate 112 may each comprise an inner plate 124 and an outer plate 126. The inner plates 124 of the first plate 110 and the second plate 112 may face each other (i.e., such that there are no intervening components). In this way, when the tooling assembly 100 is coupled to the compressor 14 (as shown in FIGS. 4 and 5), the inner plates 124 of the first plate 110 and the second plate 112 may contact the rotor blades 32. The inner plate 124 may be composed of a first material, and the outer plate 126 may be composed of a second material different than the first material. For example, the outer plate 126 may be composed of a metal material (which advantageously adds structural integrity to the tooling assembly 100). The inner plates 124 may be composed of a non-metallic material, such as plastic, rubber, or other non-abrasive material. This advantageously prevents damage to the rotor blades 32 that could otherwise occur from contact between the rotor blades 32 and the inner plates 124.

Additionally, the axial mounting portion 108 may include at least one turnbuckle assembly 114 extending between, and coupled to, the first plate 110 and the second plate 112. The turnbuckle assemblies 114 may be configured to adjust the spacing between the plates 110, 112 (e.g., in axial direction A). In the embodiments illustrated herein, the tooling assembly 100 may include three turnbuckle assemblies 114 each extending generally parallel to one another in the axial direction A. The three turnbuckle assemblies 114 may be equally spaced apart from one another with respect to the circumferential direction C. Particularly, as shown, the tooling assembly 100 may include a first turnbuckle assembly, a second turnbuckle assembly, and a third turnbuckle assembly. The first turnbuckle assembly may extend through the plates 110, 112 at or proximate the respective first end 111 of the plates 110, 112. The second turnbuckle assembly may extend through the plates 110, 112 at a respective center of the plates 110, 112. The third turnbuckle assembly may extend through the plates 110, 112 at or proximate the respective second end 113 of the plates 110, 112. However, while FIGS. 6 through 9 each illustrate embodiments of the tooling assembly 100 having three turnbuckle assemblies 114, it should be appreciated that the tooling assembly 100 may have any suitable number of turnbuckle assemblies 114 and should not be limited to any particular number of turnbuckle assemblies 114 unless specifically recited in the claims.

As shown in FIGS. 6 through 9, the turnbuckle assembly 114 may include a turnbuckle body 118, a first rod 120, and a second rod 122. The first rod 120 and the second rod 122 may be threaded (e.g., both the first rod 120 and the second rod 122 may define external threads). The turnbuckle body 118 may define internal threads configured to threadably couple the external threads of both the first rod 120 and the second rod 122. In this way, rotating the turnbuckle body 118 in a first direction may shorten the gap (e.g., the axial gap) between the first plate 110 and the second plate 112, and rotating the turnbuckle body 118 in a second direction may lengthen the gap (e.g., the axial gap) between the first plate 110 and the second plate 112. The first rod 120 may extend from the turnbuckle body 118 to the first plate 110, and the second rod 122 may extend from the turnbuckle body 118 to the second plate 112. For example, the first rod 120 may extend through the first plate 110, and a threaded fastener 115 (e.g., such as a nut) may threadably couple to the first rod 120, thereby coupling the first rod 120 to the first plate 110. Similarly, the second rod 122 may extend through the second plate 112, and a threaded fastener 115 may threadably couple to the second rod 122, thereby coupling the second rod 122 to the second plate 112.

Additionally, as shown in FIGS. 6 through 9, the radial compression portion 116 may include a compression bar 128, at least one attachment member 130, and at least one threaded rod 132. The compression bar 128 may be radially movable relative to the axial mounting portion 108 and configured to contact one or more T-fairings 50 in a T-fairing ring. For example, as shown in FIGS. 2, 4, and 5 collectively, when the tooling assembly 100 is coupled to a compressor 14, the compression bar 128 may contact at least two T-fairings 50 of the plurality of T-fairings 50 in the T-fairing ring. Particularly, the compression bar 128 may extend circumferentially such that the compression bar 128 may contact (e.g., simultaneously) the platform 52 of up to three T-fairings 50 in a T-fairing ring. For example, the compression bar 128 may contact the platforms 52 of the T-fairings 50 and apply a radially inward force that counteracts the spring force generated by the mechanical springs 77 while still allowing the all the T-fairings 50 in the T-fairing ring to move in the circumferential direction C such that no singular T-fairing 50 is disposed entirely within the window 64 (FIG. 3).

The at least one attachment member 130 may be coupled to the outer plate 126. For example, the at least one attachment member 130 may be generally block shaped and composed of metal or other suitable material. The attachment member 130 may be threadably coupled to the outer plate 126 via one or more bolts 131 (e.g., four bolts spaced apart from one another and arranged in a square pattern) extending through the attachment member 130 and into the outer plate 126. Alternatively or additionally, the at least one attachment member 130 may be welded or integral with the outer plate 126.

The at least one threaded rod 132 may be coupled to the first plate 110 or the second plate 112 and the compression bar 128 such that rotation of the threaded rod 132 adjusts a radial position of the compression bar 128. In various embodiments, the threaded rod 132 may be threadably coupled to both a respective attachment member 130 and the compression bar 128. For example, the threaded rod 132 may define external threads, and the attachment member 130 and the compression bar 128 may define internal threads corresponding to the external threads of the threaded rod 132, such that rotation of the threaded rod 132 adjusts a radial position of the compression bar 128. In many embodiments, each threaded rod 132 may extend through a respective attachment member 130 and into the compression bar 128. In exemplary embodiments, as shown in FIGS. 6 through 9, the compression bar 128 may defines a slot 134, and the threaded rod 132 may extend into the slot 134 of the compression bar 128.

In various embodiments, when the tooling assembly 100 is coupled to a compressor 14, as shown in FIGS. 2, 4, and 5, the threaded rods 132 may be oriented generally radially with respect to the central axis of the gas turbine 10. In exemplary embodiments, the number of threaded rods 132 may correspond to the number of attachments members 130, which is four in the embodiment shown but is not necessarily limited to four. In exemplary embodiments, all of the threaded rods 132 (e.g., all four of the threaded rods 132) may extend into the slot 134 of the compression bar 128.

Figure 10:
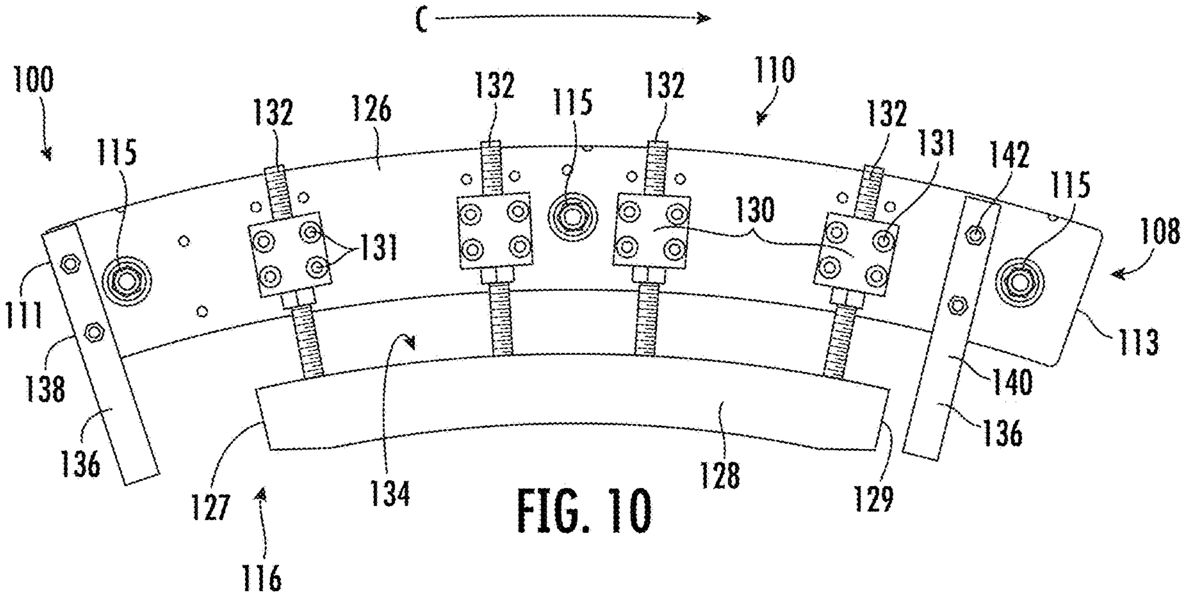
FIG. 10 illustrates a planar view of a tooling assembly, in accordance with embodiments of the present disclosure.
Figure 11:
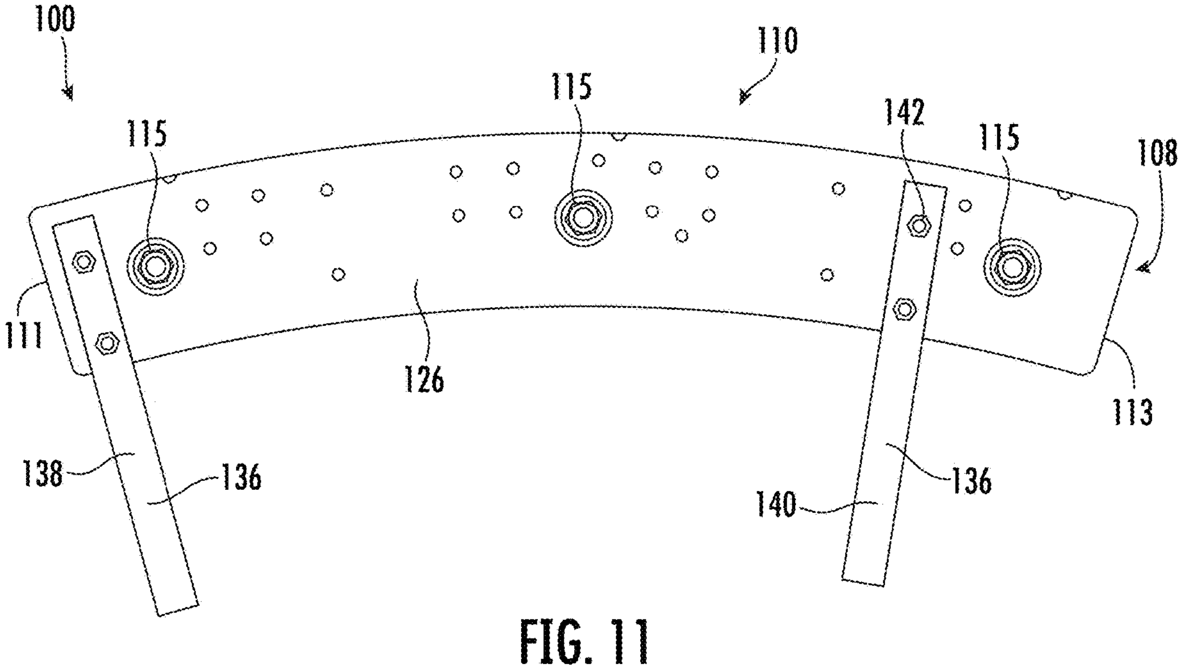
FIG. 11 illustrates a planar view of a tooling assembly, in accordance with embodiments of the present disclosure.

FIGS. 10 and 11 each illustrates a planar view of the first tooling assembly 102. For example, FIG. 10 illustrates the second plate 112 of the first tooling assembly 102, which is equipped with a radial compression portion 116. FIG. 11 illustrates a planar view of the first plate 110 of the first tooling assembly 102, which is not equipped with a radial compression portion 116. Particularly, the second plate 112 shown in FIG. 10 includes an attachment member 130, threaded rod 132, and compression bar 128 coupled thereto, and the first plate 110 shown in FIG. 11 does not.

In many embodiments, as shown, one or more radial spacers 136 may be coupled to one of (or both) the first plate 110 and the second plate 112. Particularly, the radial spacers 136 may be threadably coupled to the outer plate 126 via one or more bolts 142. The radial spacers 136 may be generally shaped as rectangular prisms oriented radially (with respect to the radial direction of the gas turbine 10. The radial spacers may include a first radial spacer 138 disposed at or proximate the first end 111 of the plates 110, 112 and a second radial spacer 140 disposed at or proximate the second end 113 of the plates 110, 112. radial spacers 136 may contact one or more components of the compressor 14 when the tooling assembly 100 is coupled thereto to ensure proper orientation and alignment.

As shown in FIGS. 10 and 11 collectively, the first plate 110, the second plate 112, and the compression bar 128 may include a circumferential contour (with respect to a circumferential direction C of the gas turbine 10). That is, the first plate 110 and the second plate 112 may continually curve in the circumferential direction C of the gas turbine 10 as the plates 110, 112 extend from the respective first end 111 to the respective second end 113. Similarly, compression bar 128 may curve in the circumferential direction C as the compression bar 128 extends from a first end 127 to a second end 129. The circumferential curvature of the compression bar 128 may match an exterior surface of the T-fairings 50 with which the compression bar 128 contacts, thereby equally distributing the radial force among the T-fairings 50.

In various embodiments, one or more of the compression bar 128, the inner plate 124, the radial spacer 136, and/or the turnbuckle assembly 114 may be composed of a non-metallic material. Particularly, the first rod 120 and/or the second rod 122 of the turnbuckle assembly 114 may be composed of a non-metallic material. Alternatively or additionally, the first rod 120 and/or the second rod 122 of the turnbuckle assembly 114 may include a cover (such as an outer sleeve) that is composed of a non-metallic material. In exemplary embodiments, the non-metallic material may be plastic, rubber, or other non-abrasive material. This advantageously prevents damage to the compressor components with which the tooling assembly 100 contacts. Additionally, forming the compression bar 128 from a non-metallic material (such as plastic) advantageously reduces the coefficient of friction between the T-fairings 50 and the compression bar 128, thereby allowing the T-fairings 50 to rotate circumferentially within the slot 62 as necessary during installation.

Figure 12:
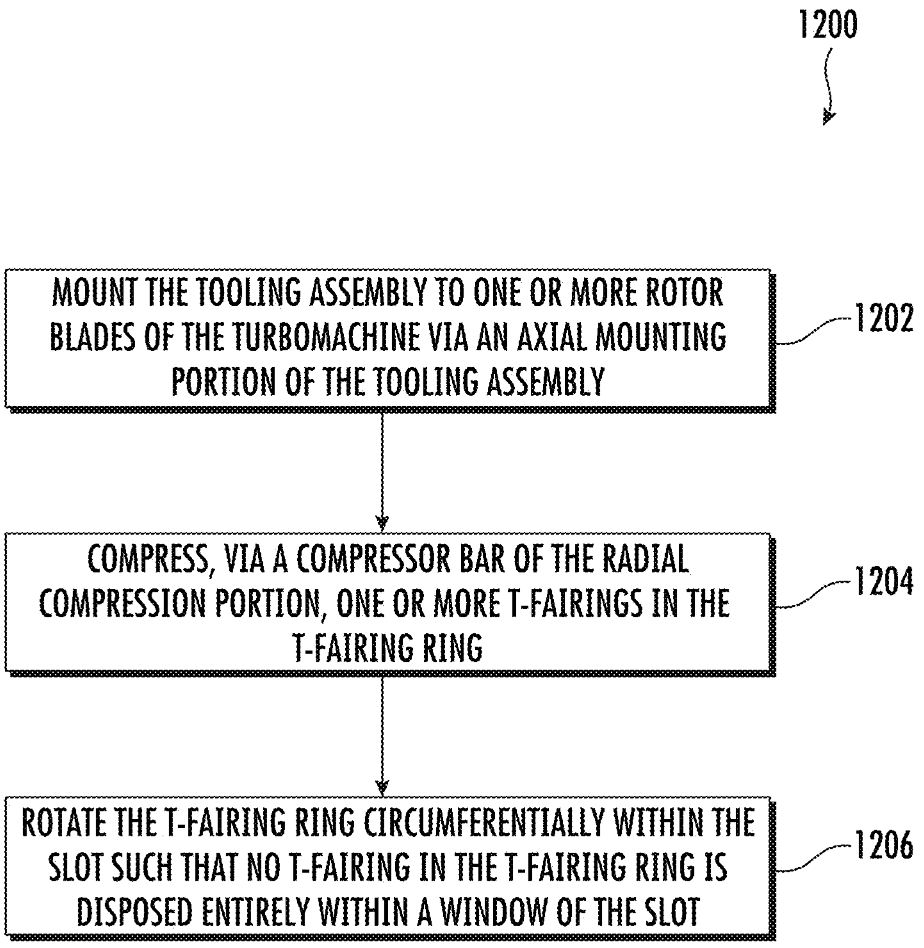
FIG. 12 illustrates a flow chart of a method for installing a T-fairing ring in a slot of a turbomachine, in accordance with embodiments of the present disclosure.

Referring now to FIG. 12, a flow diagram of one embodiment of a method 1200 of installing a T-fairing ring in a slot of a turbomachine is illustrated in accordance with aspects of the present subject matter. In general, the method 1200 will be described herein with reference to the gas turbine 10, the compressor 14, and the tooling assembly 100 described above with reference to FIGS. 1-11. However, it will be appreciated by those of ordinary skill in the art that the disclosed method 1200 may generally be utilized with any suitable turbomachine and/or may be utilized in connection with a system having any other suitable system configuration. In addition, although FIG. 12 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown, the method 1200 may include at (1202), which may or may not be an initial step in the method 1200, mounting the tooling assembly to one or more rotor blades of the turbomachine via an axial mounting portion of the tooling assembly. The axial mounting portion may include a first plate, a second plate spaced apart from the first plate, and at least one turnbuckle assembly extending between and coupled to the first plate and the second plate. At least one of the first plate and/or the second plate include a radial compression portion. The method may further include at (1204) compressing, via a compressor bar of the radial compression portion, one or more T-fairings in the T-fairing ring. For example, compressing one or more T-fairings may include simultaneously compressing at least two T-fairings in the T-fairing ring. Compressing may be applying a uniform radial force to the at least two T-fairings in the T-fairing ring with the compressor bar. In some implementations, the compressor bar may contact the platform of at least two T-fairings in the T-fairing ring and apply a radial force that counteracts the radial force of a mechanical spring disposed in a mounting portion of the T-fairings. However, the at least two T-fairings in contact with the compressor bar may still be capable of movement in the circumferential direction while the compressor bar is applying the radial force. In exemplary implementations, the method 1200 may further include at (1206), rotating the T-fairing ring circumferentially within the slot such that no T-fairing in the T-fairing ring is disposed entirely within a window of the slot. In this way, the entire T-fairing ring may rotate circumferentially relative to the tooling assembly, such that the T-fairings in contact with the compressor bar may slide circumferentially relative to the compressor bar, and such that the compressor bar may come into contact with a new (or different) T-fairing in the T-fairing ring while the T-fairing ring is rotated circumferentially.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A tooling assembly for installation relative to a first and second turbomachine component, the tooling assembly comprising: an axial mounting portion removably couplable to the first turbomachine component, the axial mounting portion comprising a first plate, a second plate spaced apart from the first plate, and at least one turnbuckle assembly extending between and coupled to the first plate and the second plate, wherein at least one of the first plate and the second plate include a radial compression portion, the radial compression portion comprising: a compression bar radially movable relative to the axial mounting portion and configured to contact the second turbomachine component.

The tooling assembly as in one or more of these clauses, wherein at least one of the first plate, the second plate, and the compression bar includes a circumferential contour.

The tooling assembly as in one or more of these clauses, wherein the first plate and the second plate each comprise an inner plate configured to contact the first turbomachine component and an outer plate.

The tooling assembly as in one or more of these clauses, wherein one or more of the compression bar, the inner plate, or the turnbuckle assembly comprise a non-metallic material.

The tooling assembly as in one or more of these clauses, further comprising one or more radial spacers coupled to at least one of the first plate and the second plate.

The tooling assembly as in one or more of these clauses, wherein the radial compression portion further comprises at least one threaded rod coupled to the first plate or the second plate and the compression bar such that rotation of the threaded rod adjusts a radial position of the compression bar.

The tooling assembly as in one or more of these clauses, wherein the compression bar defines a slot, and wherein the threaded rod extends into the slot of the compression bar.

The tooling assembly as in one or more of these clauses, wherein the radial compression portion further comprises an attachment member coupled to the at least one of the first plate and the second plate, and wherein the threaded rod is coupled to the attachment member and the compression bar.

The tooling assembly as in one or more of these clauses, wherein the turnbuckle assembly comprises a turnbuckle body, a first rod extending from the turnbuckle body to the first plate, and a second rod extending from the turnbuckle body to the second plate.

The tooling assembly as in one or more of these clauses, wherein the first component is a compressor blade, and wherein the second component is a T-fairing ring.

A tooling assembly for installation relative to a T-fairing ring and a compressor blade of a turbomachine, the tooling assembly comprising: an axial mounting portion removably couplable to the compressor blade, the axial mounting portion comprising a first plate, a second plate spaced apart from the first plate, and at least one turnbuckle assembly extending between and coupled to the first plate and the second plate, wherein at least one of the first plate and the second plate include a radial compression portion, the radial compression portion comprising: a compression bar radially movable relative to the axial mounting portion and configured to contact the T-fairing ring of the turbomachine.

The tooling assembly as in one or more of these clauses, wherein at least one of the first plate, the second plate, and the compression bar includes a circumferential contour.

The tooling assembly as in one or more of these clauses, wherein the first plate and the second plate each comprise an inner plate configured to contact the compressor blade and an outer plate.

The tooling assembly as in one or more of these clauses, wherein one or more of the compression bar, the inner plate, or the turnbuckle assembly comprise a non-metallic material.

The tooling assembly as in one or more of these clauses, further comprising one or more radial spacers coupled to at least one of the first plate and the second plate.

The tooling assembly as in one or more of these clauses, wherein the radial compression portion further comprises at least one threaded rod coupled to the first plate or the second plate and the compression bar such that rotation of the threaded rod adjusts a radial position of the compression bar.

The tooling assembly as in one or more of these clauses, wherein the radial compression portion further comprises an attachment member coupled to the at least one of the first plate and the second plate, and wherein the threaded rod is coupled to the attachment member and the compression bar.

The tooling assembly as in one or more of these clauses, wherein the turnbuckle assembly comprises a turnbuckle body, a first rod extending from the turnbuckle body to the first plate, and a second rod extending from the turnbuckle body to the second plate.

The tooling assembly as in one or more of these clauses, wherein the T-fairing ring comprises a plurality of T-fairings, and wherein the compression bar contacts at least two T-fairings of the plurality of T-fairings.

A method for installing a T-fairing ring in a slot of a turbomachine using a tooling assembly, the method comprising: mounting the tooling assembly to one or more rotor blades of the turbomachine via an axial mounting portion of the tooling assembly, the axial mounting portion comprising a first plate, a second plate spaced apart from the first plate, and at least one turnbuckle assembly extending between and coupled to the first plate and the second plate, wherein at least one of the first plate and the second plate include a radial compression portion; compressing, via a compressor bar of the radial compression portion, one or more T-fairings in the T-fairing ring; and rotating the T-fairing ring circumferentially within the slot such that no T-fairing in the T-fairing ring is disposed entirely within a window of the slot.

What is claimed is:

1. A method for installing a T-fairing ring in a slot of a turbomachine using a tooling assembly, the method comprising:

mounting the tooling assembly to one or more rotor blades of the turbomachine via an axial mounting portion of the tooling assembly, the axial mounting portion comprising a first plate, a second plate spaced apart from the first plate, and at least one turnbuckle assembly extending between and coupled to the first plate and the second plate, wherein at least one of the first plate and the second plate include a radial compression portion;

simultaneously compressing, via a compressor bar of the radial compression portion, two or more T-fairings in the T-fairing ring; and rotating the T-fairing ring circumferentially within the slot such that no T-fairing in the T-fairing ring is disposed entirely within a window of the slot.

2. The method as in claim 1, wherein the compressing step further comprises applying, with the compressor bar, a first radial force onto a platform of the T-fairing that counteracts a second radial force of a mechanical spring disposed in a mounting portion of the T-fairing.

3. The method as in claim 1, wherein at least one of the first plate, the second plate, and the compression bar includes a circumferential contour.

4. The method as in claim 1, wherein one or more of the compression bar, the first plate, the second plate, or the turnbuckle assembly comprise a non-metallic material.

5. The method as in claim 1, further comprising one or more radial spacers coupled to at least one of the first plate and the second plate.

6. The method as in claim 1, wherein the radial compression portion further comprises at least one threaded rod coupled to the first plate or the second plate and the compression bar such that rotation of the threaded rod adjusts a radial position of the compression bar.

7. The method as in claim 6, wherein the compression bar defines a slot, and wherein the threaded rod extends into the slot of the compression bar.

8. The method as in claim 6, wherein the radial compression portion further comprises an attachment member coupled to the at least one of the first plate and the second plate, and wherein the threaded rod is coupled to the attachment member and the compression bar.

9. The method as in claim 1, wherein the turnbuckle assembly comprises a turnbuckle body, a first rod extending from the turnbuckle body to the first plate, and a second rod extending from the turnbuckle body to the second plate.

* * * * *